Patented Dec. 17, 1935

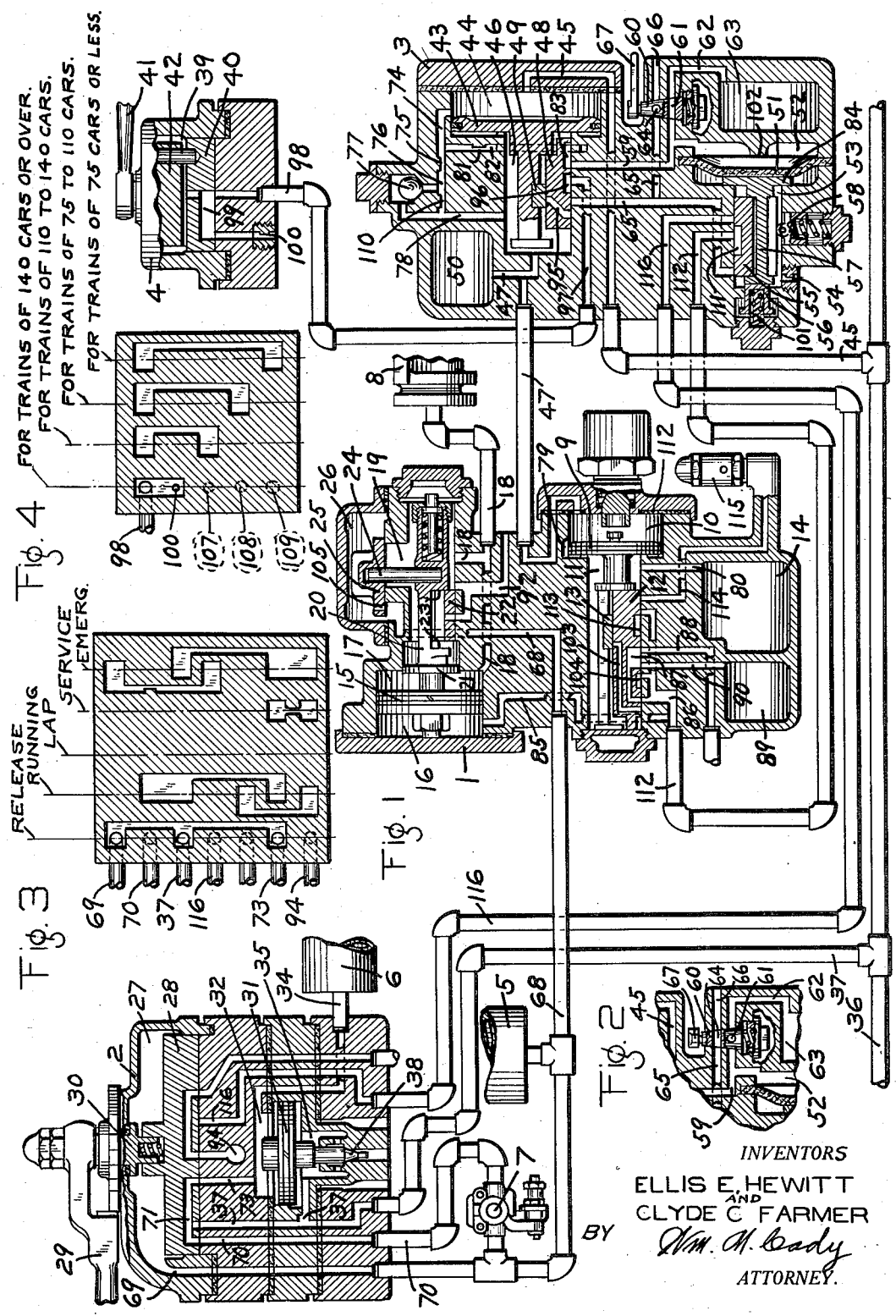

2,024,642

UNITED STATES PATENT OFFICE 2,024,642

FLUID PRESSURE BRAKE

Ellis E. Hewitt, Edgewood, and Clyde C. Farmer, Pittsburgh, Pa., assignors to The Westinghouse Air Brake Company, Wilmerding, Pa., a corporation of Pennsylvania Application February 24, 1931, Serial No. 517,660

33 Claims. (Cl. 303—47)

This invention relates to fluid pressure brakes and more particularly to the type in which the brakes are applied by effecting a reduction in pressure in the brake pipe.

To effect an application of the brakes on a train, the usual brake valve device on the locomotive is turned to a brake applying position to cause a reduction in brake pipe pressure which is first effective at the head end of the train. As a result, the brakes on the train apply serially from the front toward the rear and set up a retardation which causes the slack in the train to run in which often results in excessive shocks.

One object of our invention is to provide improved means for delaying or holding back the application of brakes on the locomotive, so that the inertia of the locomotive will tend to keep the slack in the train pulled out and thus avoid excessive shocks.

Another object of our invention is to provide improved means for delaying or holding back the application of brakes on the locomotive for a period of time, after the initiation of a brake pipe reduction, which is proportional to the length of the brake pipe on a train.

Other objects and advantages will appear in the following more detailed description of our invention.

In the accompanying drawing; Fig. 1 is a diagrammatic view, mainly in section, of a locomotive brake equipment having our invention associated therewith; Fig. 2 is a diagrammatic view of a portion of the distributing valve device shown in Fig. 1, but with a plug valve shown in a cut out position; Fig. 3 is a development view showing diagrammatically the connections established in various positions of the brake valve device shown in Fig. 1; and Fig. 4 is a diagrammatic development view of the manually operated timing control valve device shown in Fig. 1.

As shown in the drawing, the locomotive brake equipment comprises a brake controlling valve device, such as a distributing valve device 1, an automatic brake valve device 2 for controlling the operation of said distributing valve device, a hold back valve device 3, a timing control valve device 4, a main reservoir 5, an equalizing reservoir 6, a feed valve device 7, and a brake cylinder 8.

The distributing valve device comprises a casing containing the usual equalizing portion and application portion. The equalizing portion comprises a piston 9 having at one side a chamber 10 and at the other side a valve chamber 11 containing a main slide valve 12 and an auxiliary slide valve 13 adapted to be operated by said piston, the chamber 11 being in constant communication with a pressure chamber 14. The application portion of the distributing valve device comprises a piston 15 having at one side a chamber 16 and at the other side a chamber 17 open to the brake cylinder 8 through a passage and pipe 18. Extending to the right from piston 15 and through a valve chamber 19 is a piston stem 20 having mounted thereon a baffle piston 21 separating chambers 17 and 19. An exhaust slide valve 22 is disposed in chamber 19 between spaced shoulders 23 on the stem 20 and is adapted to be operated thereby. Projecting upwardly from the stem 20 is a driving pin 24 operatively engaging an application slide valve 25 contained in a chamber 26.

The automatic brake valve device 2 comprises a casing having a chamber 27 containing a rotary valve 28 adapted to be turned to various controlling positions by a handle 29 operatively connected to said rotary valve by means of a stem 30. Disposed in the brake valve casing is the usual brake pipe discharge valve mechanism comprising an equalizing piston 31 having at one side a chamber 32 connected to the equalizing reservoir 6 through a passage and pipe 34. The equalizing piston 31 has at the other side a chamber 35 connected to the brake pipe 36 through passage and pipe 37, and containing a brake pipe discharge valve 38 adapted to be operated by said piston.

In the usual locomotive brake equipment, the distributing valve device 1 operates in accordance with variations in brake pipe pressure, but as shown in the drawing, the hold back valve device 3 is interposed between the distributing valve device 1 and brake pipe 36 for controlling the operation of the distributing valve device, as will hereinafter be fully described.

The hold back valve device 3 comprises a control valve portion and a timing valve portion. The control valve portion comprises a piston 43 having at one side a chamber 44 connected to the brake pipe 36 through a passage and pipe 45, and having at the other side a valve chamber 46 connected through passage and pipe 47 to the equalizing piston chamber 10 of the distributing valve device 1 and containing a main slide valve 48 and an auxiliary slide valve 49 adapted to be operated by said piston. A chamber or volume reservoir 50 is connected by passage 47 to chamber 46 for increasing the volume of said chamber.

The timing valve portion of the hold back valve device 3 comprises a flexible diaphragm 51 mounted in the casing and having at one side a chamber 52 and at the other side a valve chamber 53 which is in constant communication with the atmosphere through a choke plug 54. The chamber 53 contains a slide valve 55 adapted to be operated by deflection of said diaphragm. Projecting into valve chamber 53 is a spring-pressed member 56 adapted to engage the diaphragm stem 57 for opposing deflection of said diaphragm. The slide valve 55 is pressed into engagement with its seat by means of a spring pressed roller 58.

The diaphragm chamber 52 of the timing valve portion of the hold back device 3 is connected to the seat of the control valve slide valve 48 by means of a passage 59, and said passage has a branch leading to a plug valve 60. In the normal position of plug valve 60, a port 61 in said plug valve connects passage 59 to a passage 62 leading to a timing reservoir 63. In the cut out position of said plug valve, shown in Fig. 2, passage 59 is disconnected from passage 62, but another port 64 in said plug valve is adapted to connect passage 65 leading to the seat of slide valves 48 and 55 to an atmospheric passage 66, this latter connection being closed in the cut in position shown in Fig. 1. The plug valve 60 is adapted to be operated from one position to the other position by a handle 67.

The timing control valve device 4 comprises a casing having a chamber 39 containing a rotary valve 40 adapted to be operated by a handle 41 through the medium of an operating member 42.

In operation, to initially charge the brake equipment with fluid under pressure, fluid under pressure is supplied to the main reservoir 5 by an air compressor in the usual well known manner and flows therefrom through pipe 68 to the distributing valve device 1, to the feed valve device 7 and to the brake valve device 2 and from said pipe through passage 69 to the rotary valve chamber 27 of the brake valve device 2.

In charging the brake pipe 36, it is customary for the engineer to first move the brake valve device to release position in which the brake pipe passage 37 is connected directly to valve chamber 27 so that fluid at main reservoir pressure is supplied to the brake pipe 36 to accelerate the charging of said brake pipe. Then after a predetermined time, the brake valve device is turned to running position shown in Fig. 1.

The feed valve device 7 is adapted to reduce the pressure of fluid from that carried in the main reservoir 5 and supplied thereto through pipe 68 to that normally carried in the brake pipe 36 and supply fluid at this reduced pressure to pipe and passage 70 leading to the seat of the brake valve rotary valve 28. In running position of the brake valve device, the feed valve passage 70 is connected by a cavity 71 in the rotary valve 28 to the brake pipe passage 37, so that fluid at feed valve pressure flows from passage 70 through passage 37 to the brake pipe 36, thereby charging said brake pipe.

Fluid at feed valve pressure also flows from passage 37 to the equalizing piston chamber 35 and at the same time from cavity 71 in the rotary valve 28 through a passage 73 to the equalizing piston chamber 32 and from said chamber through passage and pipe 34 to the equalizing reservoir 6. In this manner the equalizing reservoir 6 and chambers 32 and 35 at the two sides of the equalizing piston 31 become charged with fluid at brake pipe pressure and the discharge valve 38 is held seated in the usual manner.

Fluid under pressure supplied to brake pipe 36 in the above described manner, flows through pipe and passage 45 to the control valve piston chamber 44 of the hold back valve device 3. With the control piston 43 in its inner position, as shown in the drawing, fluid under pressure flows from chamber 44 through passage 74, choke 75, passage 76, past a ball check valve 77 and through passage 78 to the control valve chamber 46 and from thence through passage 47 to the reservoir 58, and through passage and pipe 47 to the equalizing piston chamber 10 of the distributing valve device 1. With the equalizing piston 9 in its release position, a feed groove 79 is uncovered which permits fluid under pressure to flow from piston chamber 10 to valve chamber 11 and from thence through passage 80 to pressure chamber 14. In this manner the pressure chamber 14, valve chamber 11, piston chamber 10, reservoir 58 and control valve chamber 46 are charged with fluid at brake pipe pressure.

Fluid under pressure also flows from passage 74 in the hold back valve device through a choke 81, passage 82, cavity 83 in the control valve slide valve 48 and passage 59 to the timing valve diaphragm chamber 52 and from passage 59 through port 61 in the plug valve 60 and passage 62 to the timing reservoir 63 so that said chamber and reservoir also become charged with fluid at brake pipe pressure. The pressure of fluid in diaphragm chamber 52 deflects diaphragm 51 to the left until the follower plate 84 on the diaphragm stem 57 engages the casing, in which position the spring-pressed member 56 is moved to the depressed position shown in the drawing.

With the equalizing piston 9 and slide valves 12 and 13 of the distributing valve device 1 in the normal or release position, shown in Fig. 1, the application piston chamber 16 is opened to the atmosphere through passages 85 and 86, cavity 87 in the main slide valve 12 and passage and pipe 88, said pipe being open to the atmosphere. An application chamber 89 in the distributing valve device is open through passage 90 to the vented cavity 87 in the main slide valve 12 and therefore is also normally at atmospheric pressure.

A service application of the brakes is effected in the usual manner by turning the brake valve device 2 to service position in which the brake pipe passage 37 is lapped by the rotary valve 28, so as to prevent further flow of fluid under pressure from the feed valve device 7 to the brake pipe 36 and at the same time the equalizing piston chamber 32 and the connected equalizing reservoir 6 are connected to the atmosphere through passage 73, a cavity in the rotary valve 28, and an atmospheric passage 94, thereby permitting the pressure of fluid in the piston chamber 32 to reduce below the brake pipe pressure in chamber 35. Upon such a reduction, the brake pipe pressure in chamber 35 moves the equalizing piston 31 upwardly, which pulls the brake pipe discharge valve 38 away from its seat and permits fluid under pressure to flow from the brake pipe 36 to the atmosphere by way of pipe and passage 37, chamber 35 and past the open discharge valve 38. If it is desired to limit the degree of reduction in brake pipe pressure, the brake valve device is turned from service position to lap position when the desired degree of reduction is effected in the equalizing reservoir pressure acting in chamber 32. After the reduction in chamber 32 is thus stopped, the brake pipe pressure in chamber 35 continues to reduce until it becomes substantially equal to or slightly less than the pressure in chamber 32, at which time the equalizing piston 31 seats the discharge valve 38 in the usual manner, and thereby prevents any further reduction in brake pipe pressure.

As the pressure of fluid in the brake pipe 36 is reduced, a corresponding reduction occurs in the control valve piston chamber 44 of the hold back valve device 3. The rate of reduction in pressure in chamber 44 exceeds the capacity of the serially arranged chokes 110 and 75 to vent fluid under pressure from chamber 46 to chamber 44 to such an extent that a sufficient differential of pressures is obtained on the control piston 43 to shift said piston and slide valves 48 and 49 to application position in which a port 95 in the main slide valve 48 is uncovered by the auxiliary slide valve 49 and said port registers with the passage 65 which leads to the seat of the timing valve slide valve 55 and is normally lapped by said slide valve.

In application position of the control valve slide valve 48, passage 59 is connected through cavity 96 to a passage 97 which is open to the atmosphere through passage and pipe 98, cavity 99 in rotary valve 40 of the timing control valve device 4 and a choke plug 100. This permits fluid under pressure to gradually flow from the diaphragm chamber 52 and timing reservoir 63 to the atmosphere at a rate governed by the flow area of choke plug 100. When the pressure of fluid in diaphragm chamber 52 is thus reduced to a predetermined degree, the pressure of spring 101 acting through member 56 shifts the stem 57 and slide valve 55 and deflects the diaphragm 51 to application position, in which the diaphragm engages a limiting stop 102.

With the timing valve slide valve 55 in application position, passage 65 is uncovered and connected to the valve chamber 53. Passage 65 is also connected through port 95 in the control slide valve 48 to a valve chamber 46 which is in communication with chamber 50 and equalizing piston chamber 10 of the distributing valve device. As a result, fluid under pressure is permitted to flow from the equalizing piston chamber 10 and chamber 50 to the timing valve chamber 53 and from thence through the choke plug 54 to the atmosphere. This reduces the pressure in chamber 10 and permits the pressure of fluid in valve chamber 11 to shift the piston 9 and slide valves 12 and 13 to service position in which fluid under pressure is permitted to flow from the valve chamber 11 and the connected pressure chamber 14, through the service port 103 in the main slide valve 12, to passage 86, which is connected through passage 85 to the application piston chamber 16 and through a cavity 104 in the main slide valve 12 to passage 89 leading to the application chamber 89 which is provided merely to increase the volume of the application piston chamber 16.

The pressure of fluid in the application piston chamber 16 shifts the application piston 15 and slide valves 22 and 25 toward the right to application position in which the slide valve 22 laps the exhaust passage 92 and the port 105 in the slide valve 25 establishes communication between chambers 26 and 19. This permits fluid under pressure supplied from the main reservoir 5 through pipe and passage 68 to application valve chamber 26 to flow to valve chamber 19 and from thence through passage and pipe 18 to the brake cylinder 8, and thereby effect an application of the brakes.

The flow capacity of the choke plug 54 in the hold back valve device 3 is such as to permit the pressure in the equalizing piston chamber 10 to reduce at a service rate, so that when the equalizing piston 9 and slide valves 12 and 13 move to service position, the venting capacity of the service port 103 will reduce the pressure in valve chamber 11 at a rate sufficient to prevent a differential from building up on the equalizing piston 9 which would undesirably move said piston to emergency position in which a high pressure would be quickly obtained in the brake cylinder, as will be hereinafter described.

If the degree of brake pipe reduction is limited by operation of the brake valve device as hereinbefore described, then the control piston and slide valve 49 will remain in the right hand or application position only until the pressure in chamber 50 and in the equalizing piston chamber 10 has been reduced through operation of the timing valve portion of the hold back valve device to a degree substantially equal to or slightly less than the reduced brake pipe pressure. When the pressure in the control valve chamber 46 is thus reduced to a degree slightly less than the reduced brake pipe pressure in piston chamber 44, the piston 43 and auxiliary slide valve 49 are moved toward the left to lap position in which said slide valve laps port 95 and thus prevents further reduction of pressure to occur in reservoir 50 and piston chamber 10.

If the reduction in piston chamber 10 is thus limited, the pressure in valve chamber 11 will only reduce a corresponding degree and then the piston 9 and slide valve 13 will be moved to lap position in which port 103 is lapped, thereby limiting the degree of pressure obtained in the application piston chamber 16.

Fluid at brake cylinder pressure in passage 18 flows to chamber 17 between the application piston 15 and baffle piston 21, and when the pressure in said chamber builds up to a degree slightly greater than the pressure in chamber 16, the piston 15 is shifted toward the left. This movement of piston 16 shifts the application slide valve 25 to lap position in which the flow of fluid under pressure to valve chamber 19 and brake cylinder 8 is cut off, thereby limiting the degree of brake cylinder pressure. It will thus be apparent that if the brake pipe pressure is reduced in steps, the brake cylinder pressure will build up in steps. However, it should be noted that there will be no delay in applying the locomotive brakes in successive applications of the brakes after the initial partial application of the brakes has been effected. The reason for this is that in lap position of the control portion of the hold back valve device 3, the main slide valve remains in application position in which diaphragm chamber 52 is maintained open to the atmosphere. As a result, upon a further reduction in brake pipe pressure in the control piston chamber 44, the control piston 43 will merely move the auxiliary slide valve 49 so as to uncover the port 95 which will immediately permit fluid under pressure to be further vented from chamber 50 and the application piston chamber 10, and thus cause a further application of the brakes.

It will be noted that when a brake application is initiated, the application of the locomotive brakes is delayed for a period of time which is governed by the blow down time of the timing reservoir 63 and the connected diaphragm chamber 52 through the choke plug 100 in the timing control valve device 4.

The length of time that the application of locomotive brakes should be delayed is greater for a long train than it is for a short train, since it takes longer to get the brakes at the rear end of a long train applied so as to stop the running in of slack. As a result, this delay time should be varied in accordance with the length of the train.

The timing control valve device has been provided for varying the delay period between the initiation of a brake pipe reduction and the applying of the locomotive brakes in proportion to the length of the train. For the purpose of illustration, the seat of the rotary valve 40 is provided with a plurality of choke plugs such as 100, 107, 108 and 109 of different sizes and in different positions in the rotary valve seat, and the cavity 99 in the rotary valve 40 is adapted to connect the passage 98 to some one of these choke plugs in accordance with its position. As shown in Fig. 1, passage 98 is connected to choke plug 100 which is the proper size for timing the reduction in pressure in the timing reservoir 63 to cause the desired delay period for trains, of say 140 cars length or over. If the train length is 75 cars or less, then the cavity 99 in rotary valve 40 will be turned to connect pipe 98 to choke plug 109 which has a larger flow area than choke plug 100 and will consequently provide a shorter delay period.

For illustration, there are only four choke plugs shown in the timing control valve device, said chokes corresponding to four different train lengths. It is obvious that if desired, the number of choke plugs employed could be varied for any number of different increments of train length, and if desired the timing control valve device 4 could be designed so as to vary the delay time in proportion to the train length instead of in proportion to increments of train length as illustrated.

If the brake valve device 2 is moved to emergency position, the brake pipe 37 is connected directly to the atmospheric port 94, which permits a sudden reduction in brake pipe pressure to occur so as to cause an emergency application of the brakes. This sudden reduction in brake pipe pressure permits the pressure in the control valve chamber 46 to move the control piston 43 and slide valves 48 and 49 to their right hand or application position, in which the locomotive brakes are applied in a manner similar to when a service application of the brakes is effected. After the delay period caused by the restricted reduction in pressure in diaphragm chamber 52 and the timing reservoir 63, the timing valve slide valve 55 is shifted to application position, in which the pressure of fluid in chamber 50 and the equalizing piston chamber 10 is permitted to reduce at a service rate and thus cause the equalizing portion of the distributing valve device to move to service position and supply fluid under pressure to the application piston chamber 16 and chamber 89 and cause the locomotive brakes to apply in the manner hereinbefore described.

Since in effecting an emergency application of the brakes, fluid under pressure is completely vented from the control valve piston chamber 44, the piston 43 and auxiliary valve 49 do not move to lap position as in effecting a service application of the brakes, but instead remain in the outer position in which fluid under pressure is completely vented from the reservoir 50 and equalizing piston chamber 10 at a service rate. Then, after the pressure of fluid in pressure chamber 14 and valve chamber 11 of the distributing valve device equalizes into the application piston chamber 16 and application chamber 89 and the pressure of fluid in piston chamber 10 reduces below the equalized pressure in valve chamber 11, the piston 9 and slide valves 12 and 13 move to emergency position, in which piston 9 engages a gasket 112. In emergency position, passage 86 from the application piston chamber is connected through a cavity 113 to a passage 114 leading to a safety valve 115 which operates in the usual manner to limit the pressure of fluid acting in the application piston chamber 16, for the following reason.

When the brake valve device is moved to emergency position, a passage 116 is connected to the rotary valve chamber 27 through a restricted port in the rotary valve 28, which permits a limited flow of fluid under pressure to passage and pipe 116 leading to the seat of the timing valve slide valve 55 in the hold back valve device 3. When the timing slide valve 55 is moved to its right hand or application position for venting fluid under pressure from the equalizing piston chamber 10, fluid under pressure is supplied from passage 116 through cavity 111 in said slide valve and passage and pipe 112 to passage 86 and from thence through passage 85 to the application piston chamber 16. At the same time fluid under pressure is being supplied to the piston chamber 16 by operation of the equalizing portion of the distributing valve device, but this additional supply augments the rate of build up in said chamber and after equalization of fluid under pressure from valve chamber 11 and pressure chamber 14 in the piston chamber 16 and chamber 89 and movement of the piston 9 and slide valves 12 and 13 to emergency position, this supply of fluid from the brake valve device builds up the pressure in the application piston chamber 16 to the adjustment of the safety valve device 115 and then maintains the pressure at said adjustment against any possible leakage.

It will be noted that the hold back valve device 3 prevents the usual emergency operation of the distributing valve device 1, upon a sudden reduction in brake pipe pressure, but after the delay period, the rate of build up of brake cylinder pressure is faster than when a service rate of reduction is effected in brake pipe pressure, and a higher brake cylinder pressure is obtained than in service on account of the additional supply of fluid from the brake valve device in emergency position.

In order to release after an application of the brakes, the brake valve device 2 is turned first to release position and then to running position to charge the brake pipe 36 in the manner hereinbefore described. This increase in brake pipe pressure shifts the control piston 43 and slide valves 48 and 49 to their normal or release position shown in the drawing, in which fluid under pressure is supplied from the control piston chamber 44 to the valve chamber 46 through passage 74, choke 75, past the ball check valve 77 and through passage 78. Fluid under pressure also flows from passage 74 through choke 81, passage 82, cavity 83 in the control slide valve 48 and passage 59 to the timing valve diaphragm chamber 52 and from passage 59 through port 61 in the plug valve 60 to passage 62 leading to the timing reservoir 63, thereby charging the diaphragm chamber 52 and reservoir 63. The pressure of fluid in diaphragm chamber 52 then shifts the slide valve 35 to its normal position shown in the drawing.

Fluid under pressure supplied to the control valve chamber 46 flows through passage 41 to chamber 50 and through pipe and passage 47 to the equalizing piston chamber 10 of the distributing valve device. This increase in pressure in chamber 10 moves the equalizing piston 9 and slide valves 12 and 13 to release position, in which the feed groove 79 is opened by said piston so as to permit fluid under pressure to flow from piston chamber 10 to valve chamber 11 and from thence through passage 80 to the pressure chamber 14 and thus charge said chambers with fluid at brake pipe pressure.

In release position of the equalizing slide valve 12, fluid under pressure is vented from the application piston chamber 16 through passages 85 and 86, cavity 87 in said slide valve, and the atmospheric passage and pipe 88. This permits brake cylinder pressure in chamber 17 at the right hand side of the application piston 15 to shift said piston and the slide valves 22 and 25 to release position in which fluid under pressure is vented from the brake cylinder 8 through pipe and passage 18, exhaust valve chamber 19 and the atmospheric passage 92, thereby effecting a release of the brakes.

A choke 110, by-passing the ball check valve 77 in the hold back valve device, is provided to maintain substantial equalization of fluid pressures on the two sides of the control piston 43, so that when the system is charged, if a fluctuation in brake pipe pressure in piston chamber 44 occurs, as by improper operation of the feed valve device 7, the slight reduction which may occur in piston chamber 44 will not cause undesired movement of the piston 43 and slide valves 48 and 49 to application position. The flow area of choke 110 is small and only sufficient to permit back flow from valve chamber 46 at a rate substantially equal to the rate of brake pipe pressure fluctuations.

In effecting a service application of the brakes, the pressure in valve chamber 46 is not completely vented and may be charged with fluid at 50 pounds pressure or more, whereas the pressure of fluid in the timing reservoir 63 is reduced to that of the atmosphere. Consequently, in releasing after an application of the brakes, there would be a tendency to first recharge the timing reservoir 63 up to the pressure in valve chamber 46 after which the pressure in the timing reservoir, the valve chamber 46, reservoir 50 and equalizing piston chamber 10 would be built up together. This would delay the movement of the equalizing piston 9 to release position for effecting a release of the locomotive brakes, and in order to obviate this condition, the choke 81 is provided to limit the flow to the timing reservoir 63 and thus maintain sufficient pressure in passage 74 to cause a flow through choke 75. Choke 75 is provided to limit the rate of flow of fluid under pressure to valve chamber 46, chamber 50 and the equalizing piston chamber 10, so as to prevent said chambers from becoming charged with fluid at a pressure in excess of that normally carried in the brake pipe during the period the brake valve device is in release position and the pressure of fluid in the brake pipe may be nearly equal to that in the main reservoir. If an overcharge of valve chamber 46 was permitted to occur, then when the brake valve device was moved to running position and the brake pipe pressure reduced to that supplied by the feed valve device 7 or to even a lower pressure, the greater pressure in valve chamber 46 would move the control piston 43 and slide valves 48 and 49 to application position and cause an undesired application of the brakes.

If for any reason, it is desired to render the hold back valve device 3 inoperative to delay the application of the locomotive brakes upon a reduction in brake pipe pressure, the plug valve 60 is turned from the cut in position, shown in Fig. 1, to the cut out position shown in Fig. 2. In cut out position, the timing reservoir 63 is isolated from the timing valve diaphragm chamber 52 and passage 65 is opened to the atmosphere through port 64 in the plug valve 60 and passage 66.

If a service application of the brakes is effected with the plug valve 60 in cut out position, the control piston 43 and slide valves 48 and 49 move to application position upon a reduction in brake pipe pressure and connect the equalizing piston chamber 10, reservoir 50 and control valve chamber 46 through port 95 in control valve slide valve 48 to passage 65, which is open to the atmosphere through port 64 in the plug valve 60 and the atmospheric passage 66.

The diaphragm chamber 52 is also opened to the atmosphere through passage 59, cavity 96 in the control slide valve 48, passage 97 and passage and pipe 98 leading to the timing control valve device 4. Since the timing reservoir 63 is cut off from diaphragm chamber 52, the timing valve diaphragm is immediately relieved of fluid pressure upon movement of the control valve which permits spring 101 to shift slide valve 55 to application position, in which fluid under pressure is permitted to flow from passage 65 to valve chamber 53 and from thence through the choke plug 54. Thus, fluid under pressure vented through port 95 in the control slide valve 48 is free to flow to the atmosphere through the plug valve 60 and atmospheric port 66, as well as through the choke plug 54.

The rate at which the pressure of fluid in the equalizing piston chamber 10 reduces upon a service rate of reduction in brake pipe pressure is not governed by the venting capacity through passage 65 however, but instead, the control piston moves the main slide valve 48 to open the passage 65 an amount only sufficient to permit the pressure of fluid to reduce in valve chamber 46, reservoir 50 and equalizing piston chamber 10 at the same rate as the brake pipe pressure in the control piston chamber 44 is being reduced. As a result, the distributing valve device 1 is operated in the usual manner, and as hereinbefore described, to effect a service application of the brakes.

Upon an emergency rate of reduction in brake pipe pressure, the pressure of fluid in the control valve chamber 46 shifts the control piston 43 and slide valves 48 and 49 to their extreme right hand or application position and maintains them in this position, in which passage 65 is wide open and permits a sudden emergency rate of reduction to occur in the equalizing piston chamber 10. This is made possible by the additional atmospheric opening from passage 65 through plug valve 60 and the atmospheric passage 66.

The emergency reduction in pressure in the equalizing piston chamber 10 permits the pressure in valve chamber 11 to shift the equalizing piston 9 and slide valves 12 and 13 to emergency position, in which the piston 9 engages the gasket 112.

In emergency position of the equalizing slide valves 12 and 13, passage 86 is uncovered by the slide valve 12 and permits fluid under pressure to flow from the pressure chamber 14 and valve chamber 11 to passage 86 and from thence through passage 85 to the application piston chamber 16 and cause an emergency application of the brakes.

The pressure in the application piston chamber 16 is limited in effecting an emergency application of the brakes by the safety valve device 115, and is maintained against leakage by a supply through the brake valve device 2 when in emergency position, in the same manner as hereinbefore described.

To effect a release of the brakes after an application, the brake pipe 36 is recharged and the hold back valve device 3 and distributing valve device 1 operate in the same manner as in releasing when the plug valve 60 is in the cut in position.

It will now be seen that the hold back valve device 3 operates upon a reduction in brake pipe pressure to delay the operation of the distributing valve device 1 to effect an application of the locomotive brakes for a period of time dependent upon the length of the train, as governed by the position of the timing control valve device 4, so that the brakes are applied on the rear cars of the train before the brakes are applied on the locomotive. By delaying the application of the locomotive brakes until the brakes are applied on the rear cars of the train, the inertia of the locomotive tends to maintain the slack in the train stretched out, so that when the locomotive brakes are applied, the slack in the train will be under such control by the train brakes that excessive shocks will not occur. The hold back valve device 3 may be rendered ineffective by turning the plug valve 60 to the cut-out position, shown in Fig. 2, in which position the locomotive brakes will operate in the usual manner.

While one illustrative embodiment of our invention has been described in detail, it is not our intention to limit its scope to that embodiment or otherwise than by the terms of the appended claims.

Having now described our invention, what we claim as new and desire to secure by Letters Patent, is:

1. In a fluid pressure brake, the combination with a brake pipe, of a brake controlling valve device operative upon a reduction in fluid pressure to effect an application of the brakes, and valve means operative upon either a service rate or an emergency rate of reduction in brake pipe pressure to reduce the pressure on said brake controlling valve device a predetermined time after the reduction in brake pipe pressure is initiated, said predetermined time being independent of the rate of reduction in brake pipe pressure.

2. In a fluid pressure brake, the combination with a brake pipe, of a brake controlling valve device operative upon a reduction in fluid pressure to effect an application of the brakes, and valve means operative upon either a service rate or an emergency rate of reduction in brake pipe pressure to reduce the pressure on said brake controlling valve device and adapted to hold back the venting of fluid pressure from said brake controlling valve device until after a predetermined time has elapsed from the initiation of said brake pipe reduction, said predetermined time being independent of the rate of reduction in brake pipe pressure.

3. In a fluid pressure brake, the combination with a brake pipe, of a brake controlling valve device operative upon a reduction in fluid pressure to effect an application of the brakes, valve means operated upon a reduction in brake pipe pressure for effecting a reduction in fluid pressure on said brake controlling valve device a predetermined time interval after the brake pipe reduction is initiated, and means for varying the time interval independently of the rate of reduction in brake pipe pressure.

4. In a fluid pressure brake, the combination with a brake controlling valve device subject to the pressure of fluid and operative upon a reduction in the pressure of said fluid to effect an application of the brakes, and a brake pipe, of a valve device operative to reduce the pressure of fluid acting on said brake controlling valve device only at a service rate, and means operative upon either a service rate or an emergency rate of reduction in brake pipe pressure for causing said valve device to operate.

5. In a fluid pressure brake, the combination with a brake controlling valve device subject to the pressure of fluid and operative upon a reduction in the pressure of said fluid to effect an application of the brakes, and a brake pipe, of a valve device operative to reduce the pressure of fluid acting on said brake controlling valve device only at a service rate, and means operative upon either a service rate or an emergency rate of reduction in brake pipe pressure for causing said valve device to operate a predetermined time after the reduction in brake pipe pressure is initiated.

6. In a fluid pressure brake, the combination with an equalizing valve device operative upon a reduction in fluid pressure to effect an application of the brakes, of a timing valve device for reducing the pressure on said equalizing valve device, a brake pipe, valve means operative upon a reduction in brake pipe pressure to cause said timing valve device to operate, and means controlled by said valve means for delaying the operation of said timing valve device for a predetermined time after the operation of said valve means.

7. In a fluid pressure brake, the combination with a brake pipe and a brake controlling valve device operated upon a reduction in fluid pressure for effecting an application of the brakes, of control valve means operated upon a reduction in brake pipe pressure for venting fluid from said valve device at a restricted rate and delay valve means for controlling communication through which said control valve means vents fluid from said valve device and operated upon a predetermined reduction in fluid pressure.

8. In a fluid pressure brake, the combination with a brake pipe and a brake controlling valve device operated upon a reduction in fluid pressure for effecting an application of the brakes, of control valve means operated upon a reduction in brake pipe pressure for venting fluid from said valve device, delay valve means operated upon a predetermined reduction in fluid pressure for opening communication through which said control valve means vents fluid from said valve device, and means controlled by said control valve means for venting fluid from said delay valve means.

9. In a fluid pressure brake, the combination with a brake pipe, of an equalizing valve device operated upon a reduction in fluid pressure for effecting an application of the brakes, valve means operated upon a reduction in brake pipe pressure for reducing the fluid pressure on said valve device, and means for delaying the reduction in fluid pressure on said valve device only upon the initial reduction in brake pipe pressure in effecting a graduated reduction in brake pipe pressure.

10. In a fluid pressure brake, the combination with a brake pipe, of an equalizing valve device operated upon successive reductions in fluid pressure for supplying fluid under pressure to effect a graduated application of the brakes, valve means operated upon successive reductions in brake pipe pressure, in effecting a graduated application of the brakes, for effecting corresponding successive reductions in fluid pressure on said valve device, and means for delaying for a predetermined period of time the initial reduction in fluid pressure on said valve device as effected by operation of said valve means upon the initial reduction in brake pipe pressure in effecting a graduated application of the brakes.

11. In a fluid pressure brake, the combination with a brake pipe, of an equalizing valve device operated upon successive reductions in fluid pressure for supplying fluid under pressure to effect a graduated application of the brakes, valve means operated upon successive reductions in brake pipe pressure, in effecting a graduated application of the brakes, for effecting corresponding successive reductions in fluid pressure on said valve device, and means for delaying for a predetermined period of time the initial reduction in fluid pressure on said valve device as effected by operation of said valve means upon the initial reduction in brake pipe pressure, in effecting a graduated application of the brakes, succeeding reductions in fluid pressure on said valve device being effected substantially in unison with the corresponding successive reductions in brake pipe pressure.

12. In a fluid pressure brake, the combination with a brake pipe and an equalizing valve device subject to fluid under pressure and operative upon a reduction in fluid pressure to cause an application of the brakes to be effected, of a timing reservoir normally charged with fluid under pressure, a timing valve device subject to the pressure of fluid in said timing reservoir and operative upon a reduction in pressure in said reservoir for effecting a reduction in pressure on said equalizing valve device, valve means operative upon a reduction in brake pipe pressure to vent fluid under pressure from said timing reservoir, and means for varying the rate at which fluid under pressure is vented from said timing reservoir.

13. In a fluid pressure brake, the combination with a brake pipe and an equalizing valve device subject to fluid under pressure and operative upon a reduction in fluid pressure to cause an application of the brakes to be effected, of a timing reservoir normally charged with fluid under pressure, a timing valve device subject to the pressure of fluid in said timing reservoir and operative upon a reduction in pressure in said reservoir for effecting a reduction in pressure on said equalizing valve device, valve means operative upon a reduction in brake pipe pressure to vent fluid under pressure from said timing reservoir, and valve means adjustable to correspond with the length of the train for varying the rate at which fluid under pressure is vented from said timing reservoir.

14. In a fluid pressure brake, the combination with a brake pipe and an equalizing valve device subject to fluid under pressure and operative upon a reduction in fluid pressure to cause an application of the brakes to be effected, of a timing reservoir normally charged with fluid under pressure, a timing valve device subject to the pressure of fluid in said timing reservoir and operative upon a reduction in pressure in said reservoir for effecting a reduction in pressure on said equalizing valve device, valve means operative upon a reduction in brake pipe pressure to vent fluid under pressure from said timing reservoir, and a valve device manually adjustable for varying the rate at which fluid under pressure is vented from said timing reservoir to correspond with different lengths of train.

15. In a fluid pressure brake, the combination with a brake pipe and an equalizing valve device normally subject to the pressure of fluid and operative upon a reduction in fluid pressure to effect an application of the brakes and upon an increase in fluid pressure for effecting a release of the brakes, of a hold back valve device operative upon an increase in brake pipe pressure to supply fluid under pressure from said brake pipe to said equalizing valve device and operative upon a reduction in brake pipe pressure to reduce the pressure acting on said equalizing valve device after a predetermined time has elapsed from the initiation of said brake pipe reduction, and means for rendering said hold back valve device inoperative to delay the reduction in pressure on said equalizing valve device upon a reduction in brake pipe pressure.

16. In a fluid pressure brake, the combination with a brake pipe and an equalizing valve device normally subject to the pressure of fluid and operative upon a reduction in fluid pressure to effect an application of the brakes and upon an increase in fluid pressure for effecting a release of the brakes, of a hold back valve means for supplying fluid under pressure from said brake pipe to said equalizing valve device upon an increase in brake pipe pressure and for reducing the pressure of fluid on said equalizing valve device upon a reduction in brake pipe pressure, said hold back valve means comprising a timing reservoir, a valve device operative upon an increase in brake pipe pressure for supplying fluid under pressure to said equalizing valve device and to said timing reservoir, and upon a reduction in brake pipe pressure to cut off said supply and connect said timing reservoir to a passage for reducing the pressure in said timing reservoir, a timing valve normally maintained in an inoperative position by the pressure of fluid in said timing reservoir, means for moving said timing valve to another position upon a reduction in fluid pressure in said timing reservoir for venting fluid under pressure from said equalizing valve device, and valve means for controlling the rate of venting of fluid under pressure from said timing reservoir through said passage.

17. In a fluid pressure brake, the combination with a brake pipe, and a brake valve device having a service position for effecting a reduction in brake pipe pressure at a service rate and an emergency position for effecting a reduction in brake pipe pressure at an emergency rate, of a brake controlling valve device operative upon a reduction in fluid pressure to supply fluid under pressure for effecting an application of the brakes, and valve means operative either upon a service or an emergency reduction in brake pipe pressure to effect a service reduction in pressure on said brake controlling valve device, said brake valve device being operative in emergency position to supply fluid under pressure to said brake controlling valve device for augmenting the application of brakes as effected by the hereinbefore mentioned operation of said brake controlling valve device.

18. In a fluid pressure brake, the combination with a brake pipe, and a brake valve device having a service position for effecting a reduction in brake pipe pressure at a service rate and an emergency position for effecting a reduction in brake pipe pressure at an emergency rate, of a brake controlling valve device operative upon a reduction in fluid pressure to supply fluid under pressure for effecting an application of the brakes, means for limiting the pressure of fluid supplied to effect an application of the brakes, and valve means operative either upon a service or an emergency reduction in brake pipe pressure to effect a service reduction in pressure on said brake controlling valve device, said brake valve device being operative in emergency position to supply fluid under pressure to said brake controlling valve device for increasing the rate at which the brake application is effected and for increasing the pressure of the brake applying fluid.

19. In a fluid pressure brake, the combination with a brake pipe, and a brake valve device having a service position for effecting a reduction in brake pipe pressure at a service rate and an emergency position for effecting a reduction in brake pipe pressure at an emergency rate, of a brake controlling valve device operative upon a reduction in fluid pressure to supply fluid under pressure for effecting an application of the brakes, means for limiting the pressure of fluid supplied to effect an application of the brakes, and valve means operative either upon a service or an emergency reduction in brake pipe pressure to effect a service reduction in pressure on said brake controlling valve device, said brake valve device being operative in emergency position to supply fluid under pressure to said brake controlling valve device for increasing the rate at which the brake application is effected and for increasing the pressure of the brake applying fluid, the supply of fluid from said brake valve device to said brake controlling valve device being controlled by said valve means.

20. In a fluid pressure brake, the combination with a brake pipe, and a brake valve device having a service position for effecting a reduction in brake pipe pressure at a service rate and an emergency position for effecting a reduction in brake pipe pressure at an emergency rate, of a valve device movable upon a service reduction in pressure to a service position to effect a service application of the brakes and upon an emergency reduction in pressure to an emergency position to effect an emergency application of the brakes, said valve device being movable upon an over reduction in pressure at a service rate first to service position and then to emergency position for effecting a service application of the brakes, valve means operative upon a service reduction in brake pipe pressure to effect a service reduction in pressure on said valve device and operative upon an emergency reduction in brake pipe pressure to effect an over reduction in pressure on said valve device, a cut out valve device movable to a position for effecting an emergency reduction in pressure on said valve device upon an emergency reduction in brake pipe pressure, and means for limiting the degree of brake application effected by the operation of said valve device, said brake valve device being operative in emergency position for supplying fluid under pressure to increase the degree of brake application to, and to maintain the degree of brake application at the setting of said limiting means.

21. In a fluid pressure brake, the combination with a brake pipe, of a brake controlling valve device operative upon a reduction in brake pipe pressure to effect an application of the brakes, and valve means for controlling the operation of said brake controlling valve device in accordance with variations in brake pipe pressure, said valve means comprising a reservoir normally charged with fluid under pressure, a timing valve device normally maintained in one position by the pressure of fluid in said reservoir and movable to an application position upon a predetermined reduction in pressure in said reservoir, for reducing the pressure on said brake controlling valve device, and a control valve movable to an application position upon a reduction in brake pipe pressure to establish a communication through which fluid under pressure is vented from said reservoir.

22. In a fluid pressure brake, the combination with a brake pipe, of a brake controlling valve device operative upon a reduction in brake pipe pressure to effect an application of the brakes, and valve means for controlling the operation of said brake controlling valve device in accordance with variations in brake pipe pressure, said valve means comprising a reservoir normally charged with fluid under pressure, a timing valve device normally maintained in one position by the pressure of fluid in said reservoir and movable to an application position upon a predetermined reduction in pressure in said reservoir for reducing the pressure on said brake controlling valve device at a service rate, and a control valve movable to an application position upon a reduction in brake pipe pressure to establish a communication through which fluid under pressure is vented from said reservoir, and to establish another communication from said equalizing valve device to said timing valve device through which fluid under pressure is vented from said equalizing valve device, and a manually operable valve movable to a position for establishing a direct connection from the last mentioned communication to the atmosphere and for cutting off said reservoir from said timing valve device.

23. In a fluid pressure brake, the combination with a brake pipe, of a brake controlling valve device operative upon a reduction in pressure in a chamber to effect an application of the brakes and operative upon an increase in pressure in said chamber to effect a release of the brakes, a reservoir, a timing valve device operative upon a reduction in pressure in said reservoir to open a communication through which fluid under pressure is vented from said chamber, a control valve device subject to the opposing pressures of said chamber and the brake pipe and operative upon a reduction in brake pipe pressure to vent fluid under pressure from said reservoir and movable upon an increase in brake pipe pressure to a normal position for opening a communication through which fluid under pressure is supplied from said brake pipe to said chamber, a choke in said communication for controlling the rate of supply to said chamber, a ball check valve in said communication, a choke in a passage by-passing said ball check valve and on the chamber side of the first mentioned choke for limiting back flow of fluid under pressure from said chamber to said brake pipe upon a brake pipe reduction, a branch from said communication on the brake pipe side of said first mentioned choke for supplying fluid under pressure from said brake pipe to said reservoir, and a choke in said branch for maintaining a pressure head on the first mentioned choke, the communication through said branch to said timing reservoir being opened by said control valve device when in its normal position.

24. In a fluid pressure brake, the combination with a brake pipe, and a brake controlling valve device operative upon an increase in the pressure of fluid to effect a release of the brakes and upon a reduction in the pressure of fluid to effect an application of the brakes, of a control valve device operative upon an increase in brake pipe pressure to supply fluid under pressure to said brake controlling valve device and upon a reduction in brake pipe pressure to cut off the supply of fluid under pressure to said brake controlling valve device, and means controlled by said control valve device and operative upon a service rate and an emergency rate of reduction in brake pipe pressure to reduce the pressure of fluid acting on said brake controlling valve device at a service rate.

25. In a fluid pressure brake, the combination with a brake pipe, of a brake controlling valve device operative upon a reduction in fluid pressure to effect an application of the brakes, valve means operative upon a reduction in brake pipe pressure, to reduce the pressure on said brake controlling valve device, and means operative to prevent said valve means from effecting such reduction in pressure on said brake controlling valve device for a chosen interval of time after the reduction in brake pipe pressure is initiated.

26. In a fluid pressure brake, the combination with a brake pipe, of a brake controlling valve device operative upon a reduction in fluid pressure to effect an application of the brakes, valve means operative upon a reduction in brake pipe pressure to reduce the pressure on said brake controlling valve device a predetermined time after the reduction in brake pipe pressure is initiated, and means for limiting the rate of reduction in pressure on said brake controlling valve device to a service rate regardless of the rate of reduction in brake pipe pressure.

27. In a fluid pressure brake, the combination with a brake pipe, of a brake controlling valve device operative upon a reduction in fluid pressure to effect an application of the brakes, and valve means operative upon a service and an emergency rate of reduction in brake pipe pressure to reduce the pressure on said brake controlling valve device at a service rate, said valve means being also operative to delay the reduction in pressure on said brake controlling valve device for a predetermined time interval after the reduction in brake pipe pressure is initiated.

28. In a fluid pressure brake, the combination with a brake pipe, of a brake controlling valve device operative upon a reduction in fluid pressure to effect an application of the brakes, valve means operative upon a reduction in brake pipe pressure to reduce the pressure on said brake controlling valve device, and means for limiting the rate of reduction in pressure on said brake controlling valve device to a service rate regardless of the rate of brake pipe reduction on said valve means.

29. In a fluid pressure brake, the combination with a brake pipe and a brake cylinder, of a valve device operative by fluid under pressure to supply fluid under pressure to said brake cylinder to effect an application of locomotive brakes, valve means operative to supply fluid under pressure for effecting the operation of said valve device, control means operative upon a reduction in brake pipe pressure, and timing means set in operation upon the operation of said control means, and operative to effect operation of said valve means a predetermined period of time after the reduction in brake pipe pressure is initiated.

30. In a fluid pressure brake, the combination with a brake pipe successive reductions in pressure in which are adapted to effect a graduated application of the brakes, of means on the locomotive responsive to said reductions in brake pipe pressure for effecting a graduated application of the brakes, and timing means set in operation upon initiating the initial reduction of said successive reductions in brake pipe pressure for delaying the operation of said means for a predetermined period of time after the reduction in brake pipe pressure is initiated, said timing means being inoperative to delay the operation of said means after the initial reduction of said successive reductions.

31. In a fluid pressure brake, the combination with a brake pipe a reduction in pressure in which is adapted to effect an application of the brakes on a train, of valve means on the locomotive operative upon a reduction in brake pipe pressure to effect an application of the locomotive brakes, a valve device set in operation upon initiating a reduction in brake pipe pressure for delaying the operation of said valve means for an interval of time after the reduction in brake pipe pressure is initiated, and means for varying the length of said interval of time according to the length of the train.

32. In a fluid pressure brake, the combination with a brake pipe a reduction in pressure in which is adapted to effect an application of the brakes on a train, of valve means on the locomotive operative upon a reduction in brake pipe pressure to effect an application of the locomotive brakes, a valve device for delaying the operation of said valve means for an interval of time after the reduction in brake pipe pressure is initiated, and means adjustable according to the length of the train for varying said interval of time.

33. In a fluid pressure brake, the combination with a brake pipe a reduction in pressure in which is adapted to effect an application of the brakes on a train, of valve means on the locomotive operative upon a reduction in brake pipe pressure to effect an application of the locomotive brakes, said valve means including a timing reservoir normally charged with fluid under pressure, means for venting fluid under pressure from said timing reservoir, a valve device operative when the pressure in said timing reservoir is reduced to a predetermined degree to effect the application of locomotive brakes, and a manually operated valve device for controlling the venting of fluid under pressure from said timing reservoir, said manually operated valve device having a plurality of positions corresponding to different lengths of trains, and means operative in each of said positions for determining the rate at which fluid under pressure is vented from said timing reservoir.

ELLIS E. HEWITT.
CLYDE C. FARMER.